United States Patent
Lee et al.

(10) Patent No.: US 10,746,609 B2
(45) Date of Patent: Aug. 18, 2020

(54) PATCH TYPE THERMOMETER CONTAINING A POLYMER THAT CAN BE PHASE CHANGED FROM A SOLID PHASE TO A LIQUID PHASE

(71) Applicant: DAEGU GYEONGBUK INSTITUTE OF SCIENCE AND TECHNOLOGY, Daegu (KR)

(72) Inventors: Sungwon Lee, Daegu (KR); Wooseong Jeong, Daegu (KR)

(73) Assignee: Daegu Gyeongbuk Institute of Science and Technology, Daegu (KR)

(*) Notice: Subject to any disclaimer, the term of this patent is extended or adjusted under 35 U.S.C. 154(b) by 0 days.

(21) Appl. No.: 16/512,580

(22) Filed: Jul. 16, 2019

(65) Prior Publication Data
US 2020/0141814 A1    May 7, 2020

(30) Foreign Application Priority Data
Jul. 11, 2018  (KR) .................. 10-2018-0080693

(51) Int. Cl.
| | |
|---|---|
| *G01K 7/00* | (2006.01) |
| *G01N 25/00* | (2006.01) |
| *G01K 13/00* | (2006.01) |
| *B32B 27/08* | (2006.01) |
| *G01K 7/36* | (2006.01) |

(52) U.S. Cl.
CPC ............ *G01K 13/002* (2013.01); *B32B 27/08* (2013.01); *G01K 7/36* (2013.01); *B32B 2307/208* (2013.01); *B32B 2535/00* (2013.01); *G01K 2217/00* (2013.01)

(58) Field of Classification Search
USPC ................................... 374/163, 16
See application file for complete search history.

(56) References Cited

U.S. PATENT DOCUMENTS
7,568,835 B2    8/2009    Pils et al.

FOREIGN PATENT DOCUMENTS
KR    10-1843854 B1    3/2018

OTHER PUBLICATIONS

Jin Jeon, et al., "Flexible Wireless Temperature Sensors Based on Ni Microparticle-Filled Binary Polymer Composites", Advanced Materials, 2013, pp. 850-855. vol. 25.
Communication from Korean Intellectual Property Office dated Jan. 6, 2020, issued in Application No. 10-2018-0080693.

*Primary Examiner* — Mirellys Jagan
(74) *Attorney, Agent, or Firm* — Sughrue Mion, PLLC

(57) ABSTRACT

The present invention relates to a patch type thermometer containing a polymer that can be phase changed from a solid phase to a liquid phase. The patch type thermometer provided in an aspect of the present invention demonstrates high precision since it does not include conductive particles which have been a reason of disadvantage of the conventional temperature sensor, and has the effect of no temperature deviation in repeated temperature measurements because it is composed of such a single polymer material that is phase changed in a specific temperature range so that the polymer material can be reversibly changed in the volume and shape.

9 Claims, 18 Drawing Sheets

PATCH TYPE THERMOMETER CONTAINING A POLYMER THAT CAN BE PHASE CHANGED FROM A SOLID PHASE TO A LIQUID PHASE

BACKGROUND OF THE INVENTION

1. Field of the Invention

The present invention relates to a patch type thermometer containing a polymer that can be phase changed from a solid phase to a liquid phase.

2. Description of the Related Art

A temperature sensor has been developed in order to measure temperature changes with high sensitivity. As an example, non-patent reference 1 (Adv. Mater. 2013, 25, 850-855, Flexible Wireless Temperature Sensors Based on Ni Microparticle-Filled Binary Polymer Composites) describes a temperature sensor system in which conductive particles are dispersed in a polymer mixture comprising two or more polymers.

In the temperature sensor system of the non-patent reference 1, some of the polymers in the polymer mixture undergo phase change in a certain range so that the volume expansion is maximized. At this time, the distance between the conductive particles is changed due to the volume expansion over the temperature, resulting in changes in the resistance value. By detecting the changes of the resistance value, the temperature is measured.

However, the temperature sensor system of the non-patent reference 1 has the structure wherein conductive particles are artificially dispersed in the polymer mixture, so that the dispersion state between the conductive particles and the polymer mixture cannot be precisely controlled, which has been an issue. Therefore, even though same materials are mixed at the same ratio every time, the reproducibility is lowered each time, and when temperature is measured with the temperature sensor repeatedly, coagulation of the conductive particles is observed. Due to the coagulation of the conductive particles, a temperature deviation occurs in which the resistance changes over the temperature become inaccurate, and accordingly the accuracy of the temperature sensor is significantly lowered.

Thus, it is required to develop a temperature sensor without temperature deviation but with high sensitivity to temperature change by not using conductive particles which are the reason of disadvantage of the temperature sensor system of the non-patent reference 1.

PRIOR ART REFERENCE

Non-Patent Reference (Non-Patent Reference 1) Adv. Mater. 2013, 25, 850-855, Flexible Wireless Temperature Sensors Based on Ni Microparticle-Filled Binary Polymer Composites

SUMMARY OF THE INVENTION

It is an object of the present invention to provide a patch type thermometer with high precision but not causing temperature deviation, according to an aspect of the present invention.

It is another object of the present invention to provide a method for measuring body temperature using the patch type thermometer above, according to another aspect of the present invention.

To achieve the above objects, the present invention provides a patch type thermometer comprising a magnetic sensor; a $1^{st}$ polymer layer laminated on the magnetic sensor; a $2^{nd}$ polymer layer coated on the surface of the $1^{st}$ polymer layer; and a magnet stacked on the $2^{nd}$ polymer layer, in which the $1^{st}$ polymer in the $1^{st}$ polymer layer can be phase-changed from a solid phase to a liquid phase, according to an aspect of the present invention.

The present invention also provides a method for measuring body temperature comprising the following steps:
contacting the patch type thermometer to the living body; and
measuring the distance change between the magnetic sensor and the magnet.

ADVANTAGEOUS EFFECT

The patch type thermometer provided in an aspect of the present invention demonstrates high precision since it does not include conductive particles which have been a reason of disadvantage of the conventional temperature sensor, and has the effect of no temperature deviation in repeated temperature measurements because it is composed of such a single polymer material that is phase changed in a specific temperature range so that the polymer material can be reversibly changed in the volume and shape.

DESCRIPTION OF THE PREFERRED EMBODIMENTS

Figure 1:
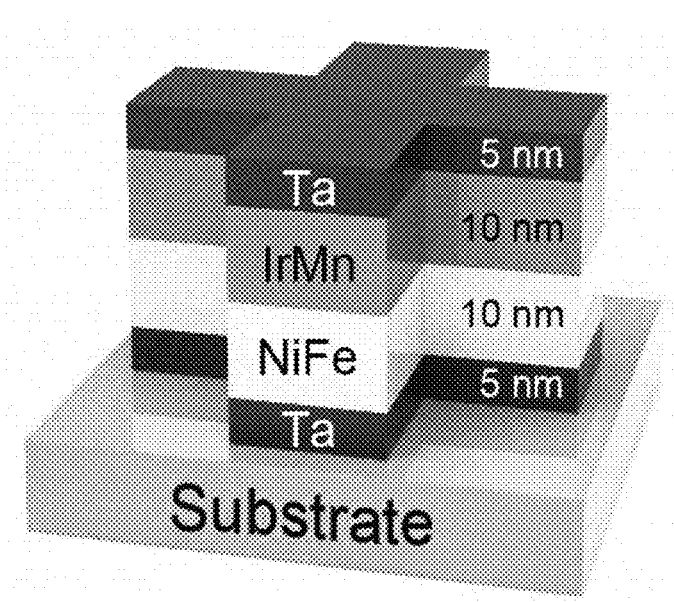
FIG. 1 is a diagram illustrating the structure of PHR (Planar Hall Resistance) sensor layer.

Hereinafter, the present invention is described in detail.

In an aspect of the present invention, the present invention provides a patch type thermometer comprising a magnetic sensor; a $1^{st}$ polymer layer laminated on the magnetic sensor; a $2^{nd}$ polymer layer coated on the surface of the $1^{st}$ polymer layer; and a magnet stacked on the $2^{nd}$ polymer layer, in which the $1^{st}$ polymer in the $1^{st}$ polymer layer can be phase-changed from a solid phase to a liquid phase.

The said patch type thermometer has the system in which body temperature or temperature is measured by sensing the changes of the magnetic field intensity caused by the reversible changes in the distance between the magnetic sensor and the magnet. At this time, the changes in the distance between the magnetic sensor and the magnet are caused by the volume changes of the $1^{st}$ polymer. More precisely, the $1^{st}$ polymer is phase changed from a solid phase to a liquid phase as temperature rises, leading to the volume change and expansion. The temperature range can be from 35° C. to 40° C.

As for the patch type thermometer above, conductive particles which have been a cause of the disadvantages described in the prior art, are removed and only a single polymer that can be phase-changed in a certain range is used instead of a polymer mixture. In addition, a magnetic sensor and a magnetic sheet have been introduced in the thermometer. Thus, unlike the conventional system that reads the changes of resistance value over the temperature, this system has a magnetic sensor to read the changes of the magnetic field strength caused by the changes of the distance between the magnetic sheet and the magnetic sensor according to the temperature-dependent volume expansion.

Considering the characteristics of the magnetic sensor, a precise measurement is possible. In addition, since there is no conductive particle which causes the disadvantages described in the prior art, the thermometer of the present invention demonstrates high precision, compared with the prior art. The thermometer of the invention is also composed of a single polymer material that can be phase-changed in a certain range instead of a polymer mixture, so that even after repeated temperature measurement the temperature deviation does not occur because the volume and shape of the polymer material can be reversibly changed.

The magnetic sensor can be any informed magnetic sensor without limitation. As an example, PHR (Planar Hall Resistance) sensor can be used.

The $1^{st}$ polymer of the $1^{st}$ polymer layer can be used without limitation as long as it is a polymer that can be phase-changed from a solid phase to a liquid phase at the temperature range of 35° C. to 40° C. and induced volume expansion. As one specific example, polyethylene glycol 1000 (PEG1000) can be used as the $1^{st}$ polymer. Since the melting point of PEG 1000 is about 37° C., the phase change from a solid phase to a liquid phase occurs as the temperature rises from 35° C. to 40° C., and the volume expansion is induced. Due to the volume expansion, the distance between the magnetic sensor and the magnet is distant, resulting in the changes in the magnetic field strength. As another specific example, polyurethane, polyester, polyethylene or polyamide whose molecular weight has been regulated appropriately for the phase change from a solid phase to a liquid phase at the temperature range of 35° C. to 40° C. can be used.

The $2^{nd}$ polymer of the $2^{nd}$ polymer layer is not supposed to be phase-changed from a solid phase to a liquid phase, unlike the $1^{st}$ polymer above. The $2^{nd}$ polymer layer is a coating layer for preventing the $1^{st}$ polymer from flowing down in the course of the phase-change of the $1^{st}$ polymer from a solid phase to a liquid phase. A polymer useable as the $2^{nd}$ polymer is not limited as long as it is not phase changed at the temperature range of 35° C. to 40° C., and as an example, parylene can be used.

The $1^{st}$ polymer layer and the $2^{nd}$ polymer layer can be formed as a laminated thin film.

The $1^{st}$ polymer layer and the $2^{nd}$ polymer layer can be deposited by chemical vapor deposition.

In another aspect of the present invention, the present invention also provides a method for measuring body temperature comprising the following steps:

contacting the patch type thermometer to the living body; and measuring the distance change between the magnetic sensor and the magnet.

According to the method for measuring body temperature of the present invention, the body temperature is measured by detecting the changes of the magnetic field strength caused by the changes of the distance between the magnetic sensor and the magnet. At this time, the temperature range of the body temperature can be in the range of 35° C. to 40° C.

The patch type thermometer provided in an aspect of the present invention demonstrates high precision since it does not include conductive particles which have been a reason of disadvantage of the conventional temperature sensor, and has the effect of no temperature deviation in repeated temperature measurements because it is composed of such a single polymer material that is phase changed in a specific temperature range so that the polymer material can be reversibly changed in the volume and shape. This effect is supported by the following examples and experimental examples.

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLE 1

Preparation of Patch Type Thermometer

The patch type thermometer provided in an aspect of the present invention was prepared.

The patch type thermometer provided in an aspect of the present invention comprises a magnetic sensor, a $1^{st}$ polymer layer laminated on the magnetic sensor, a $2^{nd}$ polymer layer coated on the surface of the $1^{st}$ polymer layer, and a magnet stacked on the $2^{nd}$ polymer layer. Each of these components was prepared and used as follows.

<1-1> Magnetic Sensor)

Any informed magnetic sensor can be used without limitation, but PHR (Planar Hall Resistance) sensor was used in an example of the present invention.

Figure 2:
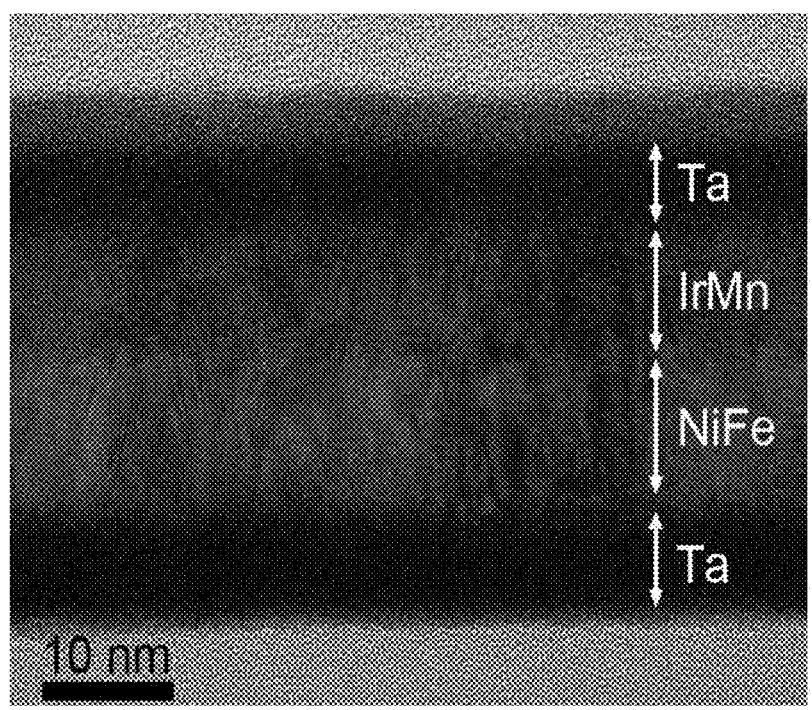
FIG. 2 is a photograph of PHR (Planar Hall Resistance) sensor layer observed with a microscope.

The structure of PHR sensor layer is shown in FIG. 1, and the photograph thereof observed with a microscope is presented in FIG. 2.

FIG. 1 is a diagram illustrating the structure of PHR (Planar Hall Resistance) sensor layer.

FIG. 2 is a photograph of PHR (Planar Hall Resistance) sensor layer observed with a microscope.

As shown in FIGS. 1 and 2, the structure of the PHR sensor is composed of Ta 5 nm (tantalum)/IrMn 10 nm (iridium manganese)/NiFe 10 nm (nickel ferrite)/Ta 5 nm (tantalum).

The unique characteristics of the PHR sensor are shown in FIGS. 3~6.

Figure 3:
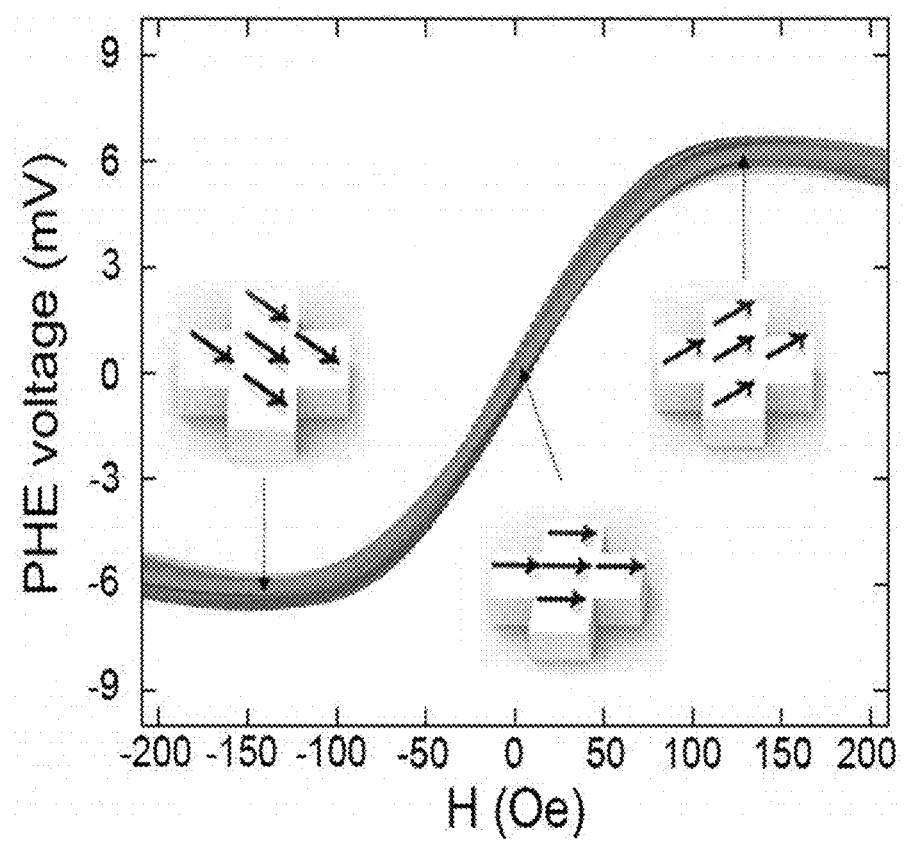
FIG. 3 is a graph illustrating the voltage difference caused by PHE (planar hall effect) according to the applied magnetic field.

FIG. 3 is a graph illustrating the voltage difference caused by PHE (planar hall effect) according to the applied magnetic field.

Figure 4:
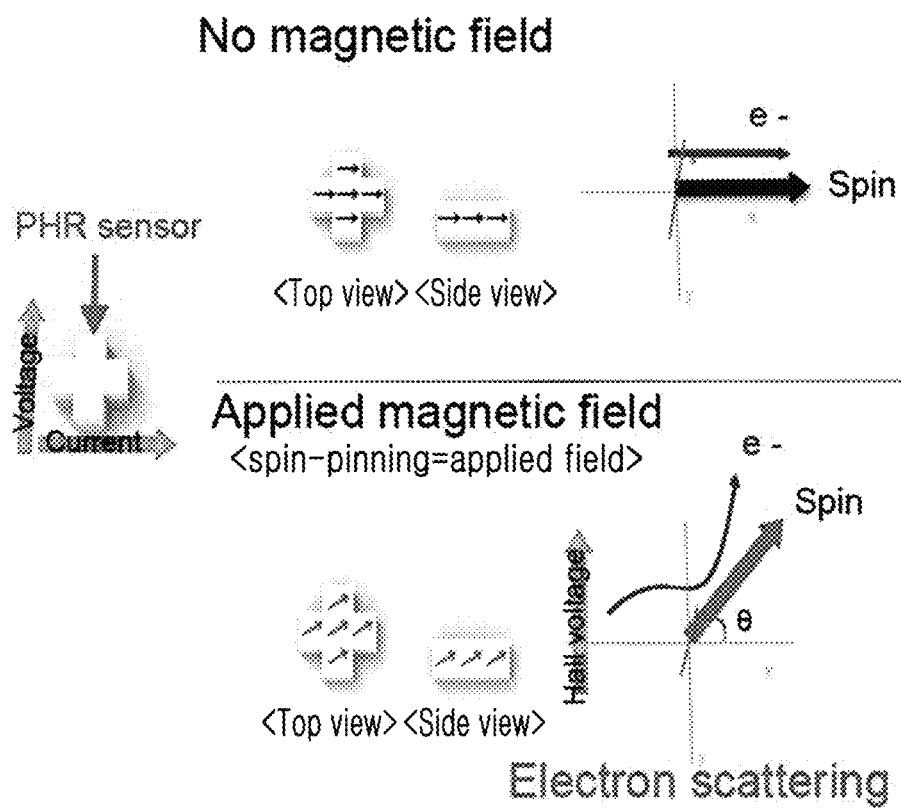
FIG. 4 is a graph illustrating the electron scattering characteristics according to the presence or absence of a magnetic field.

FIG. 4 is a graph illustrating the electron scattering characteristics according to the presence or absence of a magnetic field.

Figure 5:
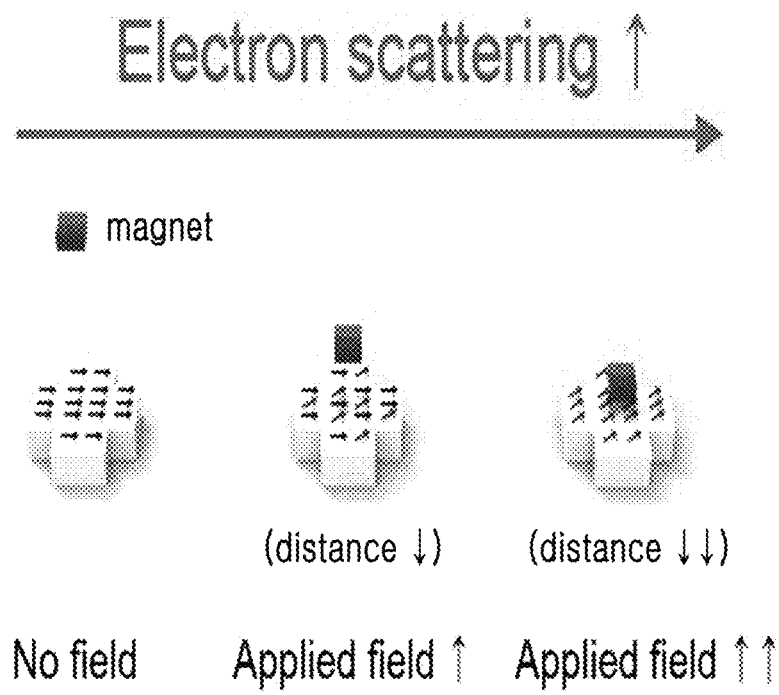
FIG. 5 is a graph illustrating the electron scattering characteristics according to the distance change between the magnetic sensor and the magnet.

FIG. 5 is a graph illustrating the electron scattering characteristics according to the distance change between the magnetic sensor and the magnet.

Figure 6:
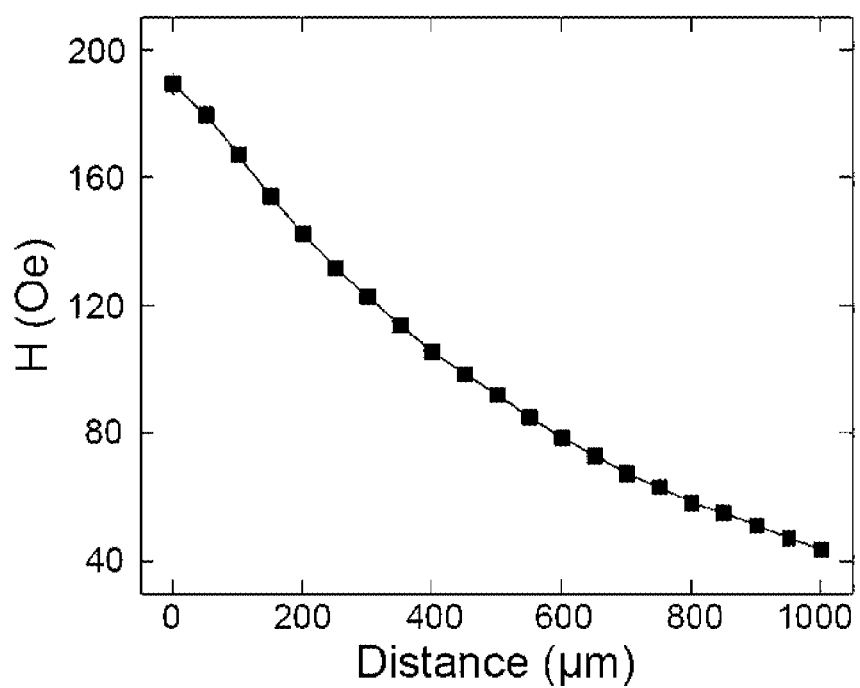
FIG. 6 is a graph illustrating the changes in intensity of a magnetic field according to the distance change between the magnetic sensor and the magnet.

FIG. 6 is a graph illustrating the changes in intensity of a magnetic field according to the distance change between the magnetic sensor and the magnet.

Regarding the PHR sensor used in an example of the present invention, electrons are scattered by the magnetic field due to hall effect called PHE (planar hall effect). As a result, a voltage difference occurs at specific two points, and the voltage difference varies depending on the strength of the applied magnetic field. This can be confirmed in the graphs of FIGS. 3, 4, 5 and 6.

In particular, as shown in FIG. 6, as the distance between the magnetic sensor and the magnet is closer, the strength of the magnetic field becomes stronger.

<1-2> $1^{st}$ Polymer Laminated on the Magnetic Sensor

Figure 7:
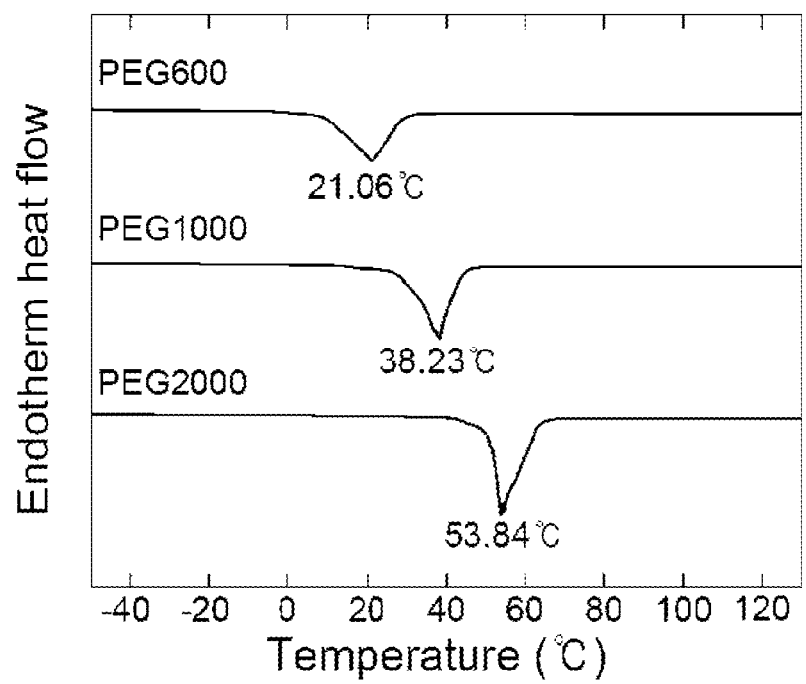
FIG. 7 is a graph illustrating the melting points of PEG600, PEG1000 and PEG2000 measured by DSC (Differential Scanning Calorimetry).

To select a polymer capable of volume expansion by the phase change from a solid phase to a liquid phase at the temperature range of 35° C. to 40° C., PEG600, PEG1000 and PEG2000 were prepared as candidates. The melting points of PEG600, PEG1000 and PEG2000 were measured by DSC (Differential Scanning Calorimetry), and the results are shown in FIG. 7. FIG. 7 is a graph illustrating the melting points of PEG600, PEG1000 and PEG2000 measured by DSC (Differential Scanning Calorimetry).

Figure 8:
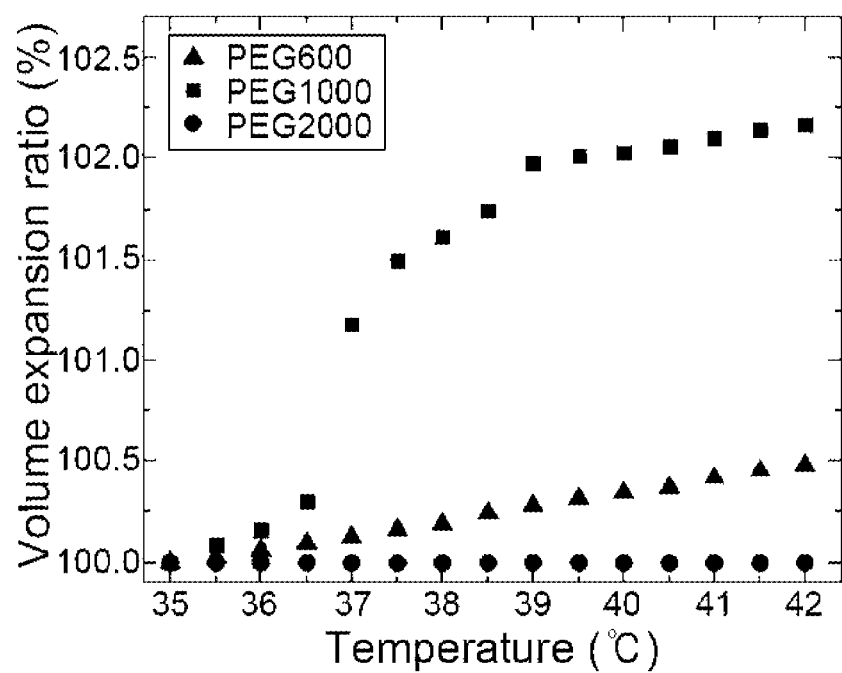
FIG. 8 is a graph illustrating the results of measuring the density (mass/volume) values of PEG600, PEG1000 and PEG2000, and the results of measuring the material-specific volume changes according to temperature by taking an inverse number.

The density (mass/volume) of each PEG6000, PEG1000 and PEG2000 was also measured, from which an inverse number was obtained and used for measuring the material-specific volume changes over the temperature, and the results are shown in FIG. 8. FIG. 8 is a graph illustrating the results of measuring the density (mass/volume) values of PEG600, PEG1000 and PEG2000, and the results of measuring the material-specific volume changes according to temperature by taking an inverse number.

The ultimate object of the present invention is to make a thermometer. Thus, based on the results shown in FIGS. 7 and 8, PEG1000 (Average molecular weight: 950-1050 g/mol, Sigma-Aldrich) which is a polymer that demonstrated maximum volume expansion at the temperature near body temperature (that is, having the melting point where the phase change from a solid phase to a liquid phase occurs) was selected as the $1^{st}$ polymer of the $1^{st}$ polymer layer.

On one side of the magnetic sensor, the $1^{st}$ polymer PEG1000 was laminated as a thin film. Additionally, a gold (Au) electrode was placed on the magnetic sensor portion where PEG1000 was not laminated.

<1-3> $2^{nd}$ Polymer Layer Coated on the Surface of the $1^{st}$ Polymer Layer A $2^{nd}$ polymer layer (that is, a coating layer) coating the $1^{st}$ polymer layer is required in order to prevent the $1^{st}$ polymer from flowing down when it is phase-changed from a solid phase to a liquid phase at the temperature range of 35° C. to 40° C. In an example of the present invention, parylene (product name: Dix-C, Daisankasei Co. Ltd., Japan) was selected as the coating layer.

The $1^{st}$ polymer layer was coated with the parylene.

<1-4> Magnet Stacked on the $2^{nd}$ Polymer Layer

A magnet sheet was stacked on the $2^{nd}$ polymer layer.

Figure 9:
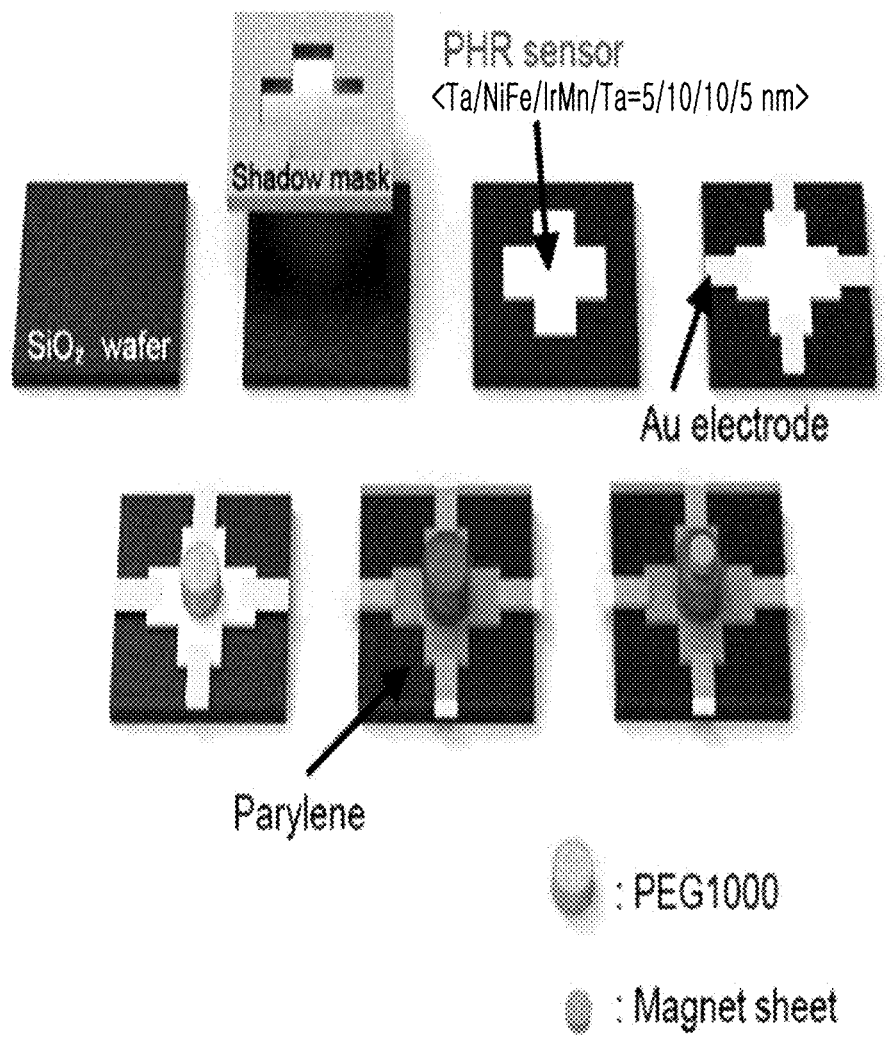
FIG. 9 is a diagram illustrating the process of manufacturing the patch type thermometer provided in an aspect of the present invention.

The patch type thermometer provided in an aspect of the present invention was prepared by performing the processes of Examples <1-1> ~ <1-4>, and the process of manufacturing thereof is shown in FIG. 9. The prepared patch type thermometer is shown in FIG. 10.

Figure 10:
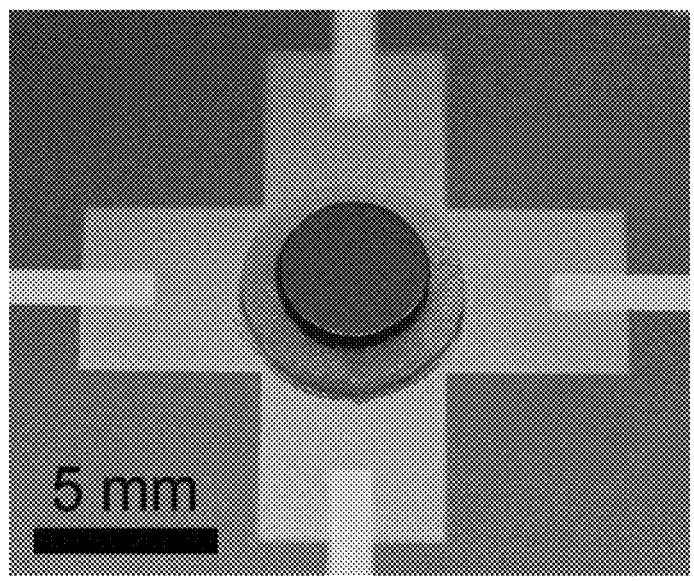
FIG. 10 is a photograph illustrating the patch type thermometer provided in an aspect of the present invention.

In FIG. 10, the topmost black is the magnet sheet. The $1^{st}$ polymer layer (that is, the volume expansion polymer) coated with the $2^{nd}$ polymer layer is shown under the magnet sheet. The cross-shaped material on the bottom is the magnetic sensor and the material formed outside of the cross is the gold electrode.

EXPERIMENTAL EXAMPLE 1

Evaluation of Performance

The performance of the patch type thermometer prepared in Example 1 was evaluated as follows.

<1-1> Evaluation of Volume Expansion of the $1^{st}$ Polymer Layer According to Temperature Change The extent of the volume expansion of the $1^{st}$ polymer layer was evaluated with raising the temperature from 35° C. to 40° C. The results are shown in FIGS. 11 and 12.

Figure 11:
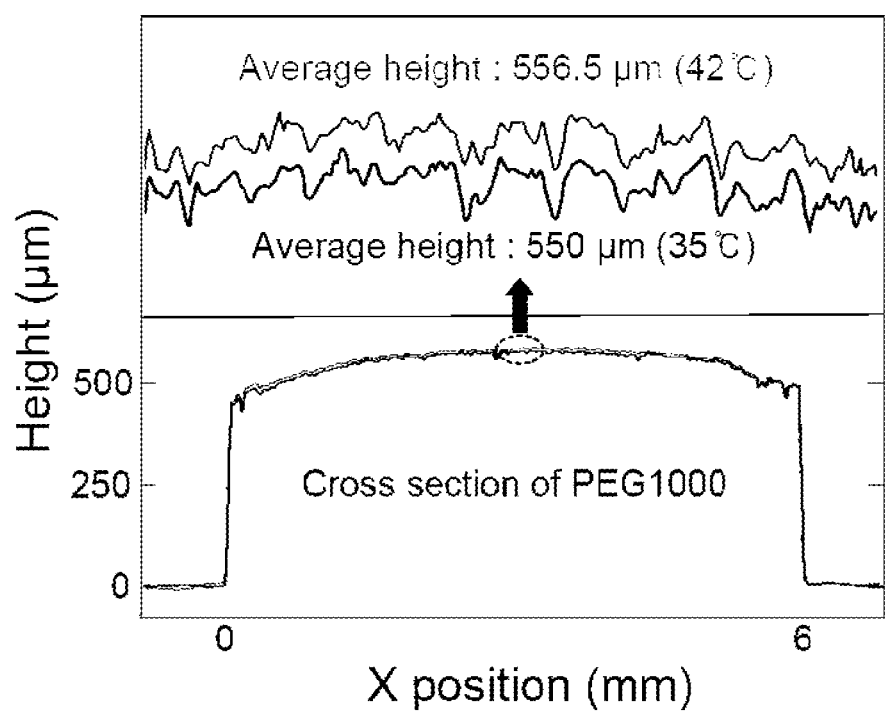
FIG. 11 is a graph illustrating the height changes of the $1^{st}$ polymer layer at 35° C. and 42° C.

FIG. 11 is a graph illustrating the height changes of the $1^{st}$ polymer layer at 35° C. and 42° C. FIG. 12 is a graph illustrating the height changes of the $1^{st}$ polymer layer according to the temperature increase by 1° C. from 35° C. to 42° C.

Figure 12:
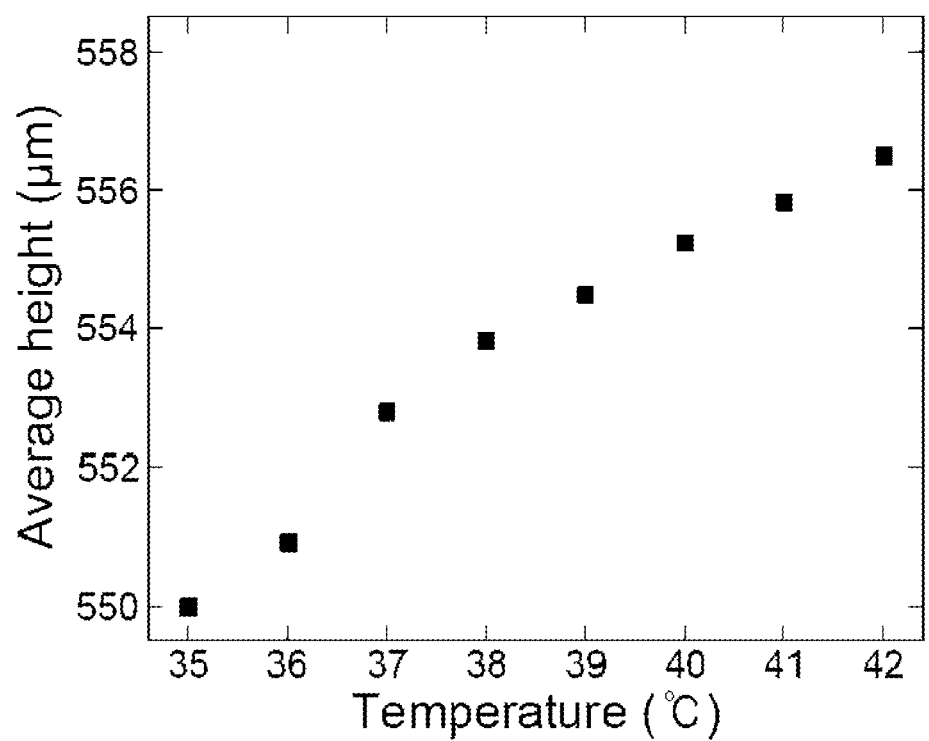
FIG. 12 is a graph illustrating the height changes of the $1^{st}$ polymer layer according to the temperature increase by 1° C. from 35° C. to 42° C.

As shown in FIGS. 11 and 12, the height changes of the $1^{st}$ polymer layer were significant at the temperature range of 35° C. to 40° C., indicating that the patch type thermometer provided in an aspect of the present invention was very sensitive to body temperature measurement.

Figure 13:
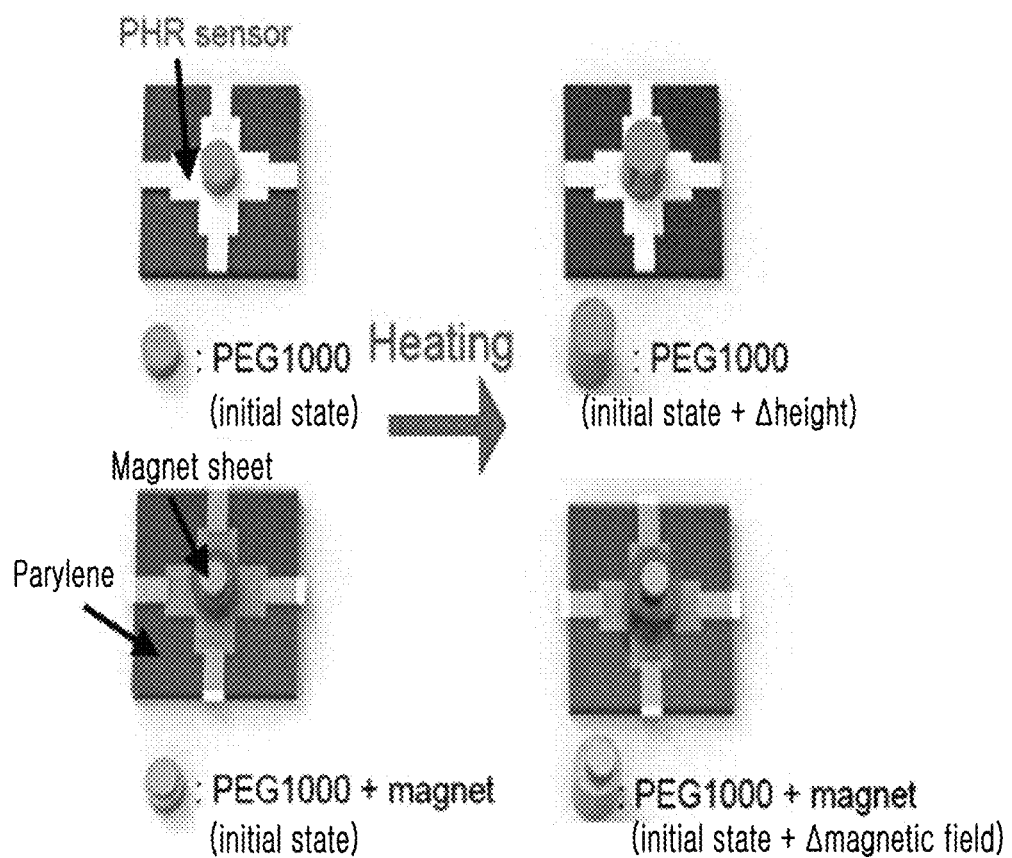
FIG. 13 is a diagram illustrating the system for detecting the distance changes between the magnetic sensor and the magnet according to the volume expansion of the $1^{st}$ polymer layer caused by temperature change.
Figure 14:
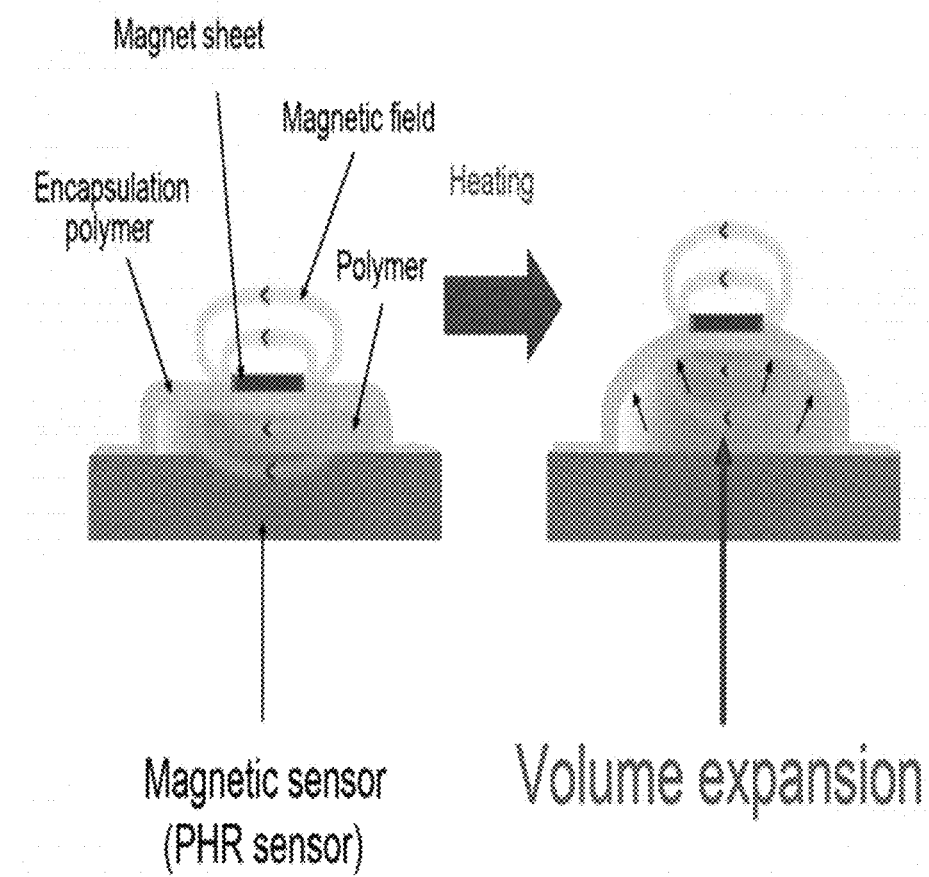
FIG. 14 is a diagram illustrating the principal of the patch type thermometer provided in an aspect of the present invention.

FIG. 13 is a diagram illustrating the system for detecting the distance changes between the magnetic sensor and the magnet according to the volume expansion of the $1^{st}$ polymer layer caused by temperature change. FIG. 14 is a diagram illustrating the principal of the patch type thermometer provided in an aspect of the present invention.

<1-2> Evaluation of Voltage Difference According to Temperature Change

The voltage difference can be known by investigating the strength of the magnetic field applied to the magnetic sensor, and the strength of the magnetic field can be measured by investigating the real-time distance of the magnet from the magnet sensor. It is possible to know how much the first distance change of the $1^{st}$ polymer layer is induced by the temperature change, and thus the voltage difference over the temperature can be theoretically measured.

Figure 15:
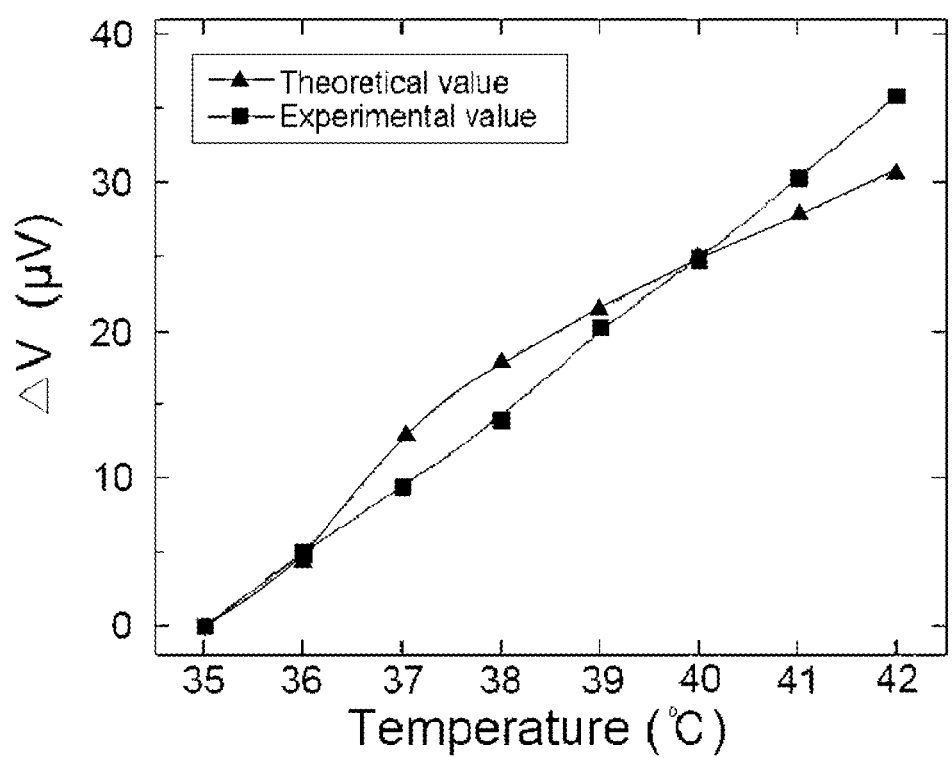
FIG. 15 is a graph illustrating the comparison of the voltage differences between the theoretically presumed voltage difference over the temperature and the actually measured voltage difference.

A graph illustrating the comparison of the voltage differences between the theoretically presumed voltage difference over the temperature and the actually measured voltage difference is shown in FIG. 15. A graph illustrating the results of evaluating whether or not the voltage difference measurement is possible by 0.2° C. in the temperature range of 36° C. to 37° C. is shown in FIG. 16.

FIG. 15 is a graph illustrating the comparison of the voltage differences between the theoretically presumed voltage difference over the temperature and the actually measured voltage difference.

Figure 16:
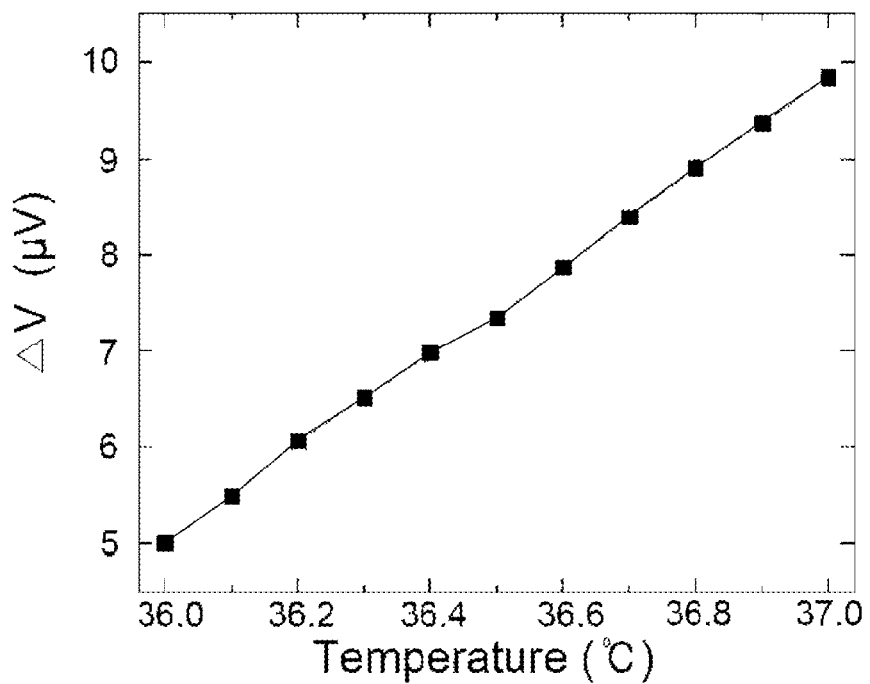
FIG. 16 is a graph illustrating the results of evaluating whether or not the voltage difference measurement is possible by 0.2° C. in the temperature range of 36° C. to 37° C.

FIG. 16 is a graph illustrating the results of evaluating whether or not the voltage difference measurement is possible by 0.2° C. in the temperature range of 36° C. to 37° C.

As shown in FIG. 15, as the temperature increased from 35° C. to 42° C., the theoretical voltage difference and the actually measured voltage difference were all increased.

As shown in FIG. 16, the temperature change was precisely measured even at the temperature change of 0.2° C.

<1-3> Evaluation of Deviation According to Repeated Measurement

Figure 17:
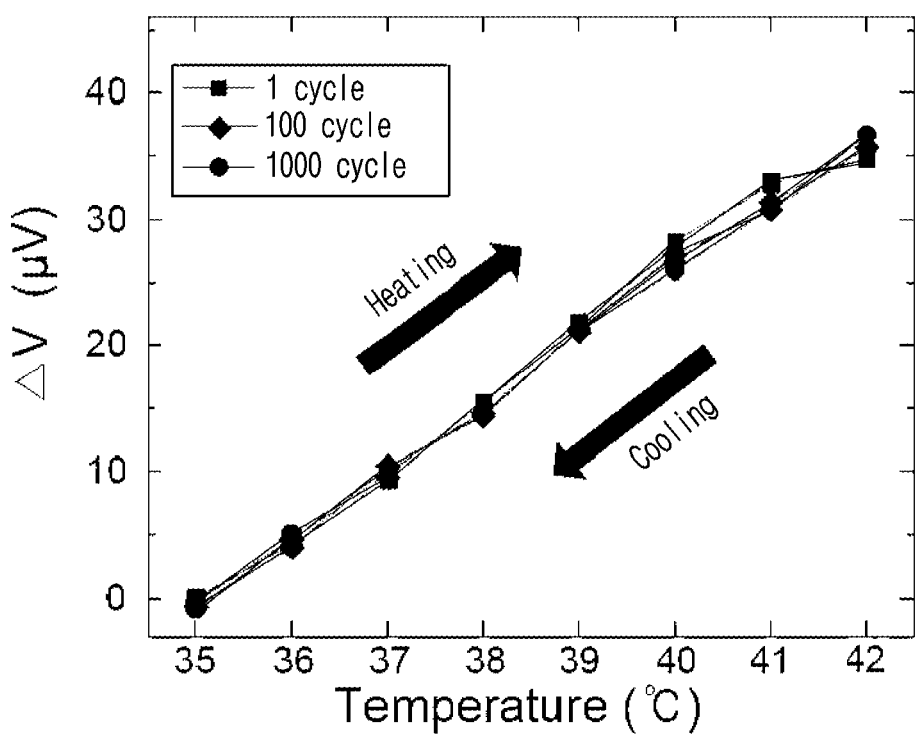
FIG. 17 is a graph illustrating that there is no temperature dependent deviation observed after the continued temperature measurement at least 1000 times using the patch type thermometer provided in an aspect of the present invention.
Figure 18:
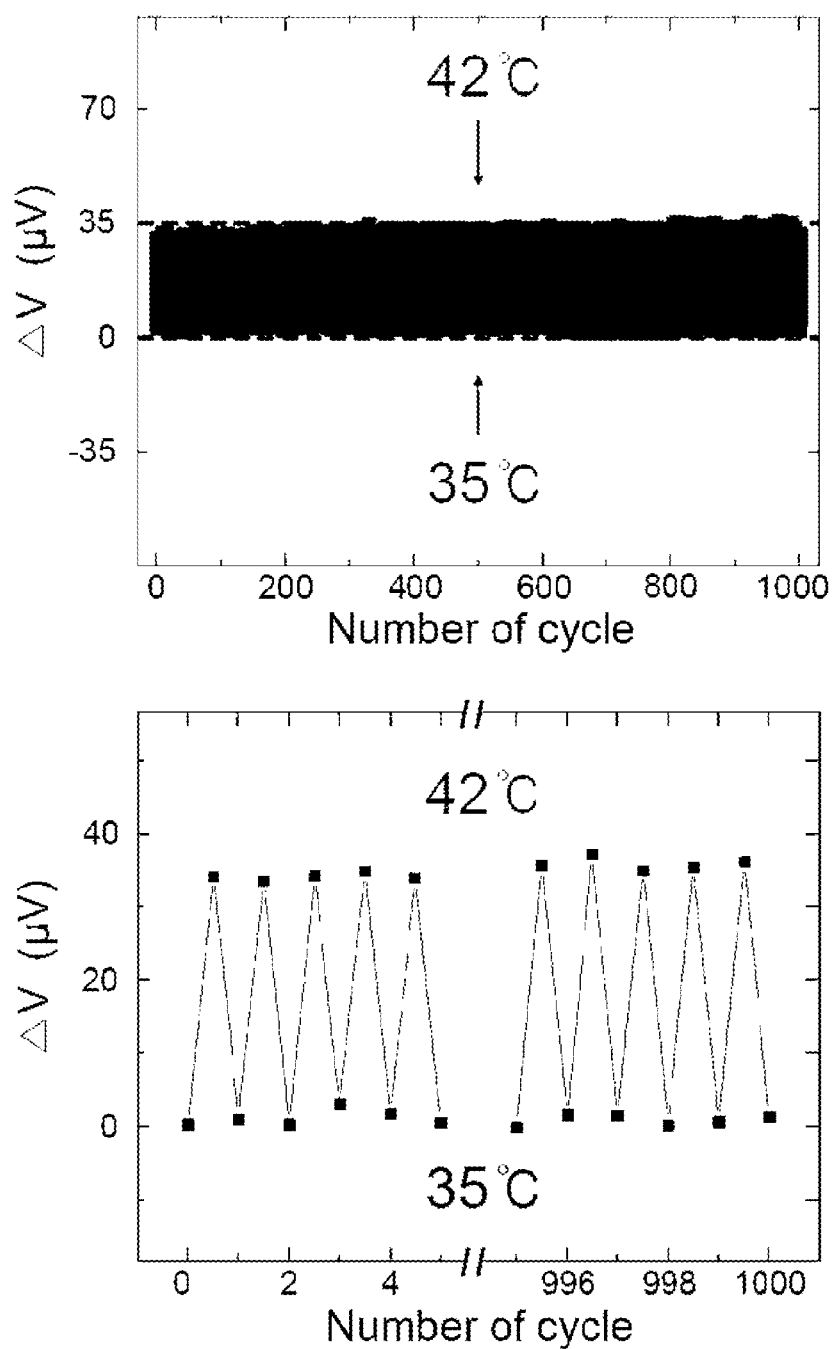
FIG. 18 is a graph illustrating the results of a cycle test confirming that there is no problem in the sensor even after the temperature measurement is repeated at least 1000 times using the patch type thermometer provided in an aspect of the present invention.

It was evaluated whether the deviations occurred as the temperature was repeatedly measured, and the results are shown in FIGS. 17 and 18.

FIG. 17 is a graph illustrating that there is no temperature dependent deviation observed after the continued temperature measurement at least 1000 times using the patch type thermometer provided in an aspect of the present invention.

FIG. 18 is a graph illustrating the results of a cycle test confirming that there is no problem in the sensor even after the temperature measurement is repeated at least 1000 times using the patch type thermometer provided in an aspect of the present invention.

As shown in FIGS. 17 and 18, even if the temperature measurement was repeated 1000 times or more using the patch type thermometer provided in an aspect of the present invention, the voltage difference according to the temperature change was precise and the deviation did not occur, indicating that the sensor had no problems with the repeated measurement.

What is claimed is:

1. A patch type thermometer comprising:
a magnetic sensor;
a first polymer layer laminated on the magnetic sensor;
a second polymer layer coated on a surface of the first polymer layer; and
a magnet stacked on the second polymer layer, in which a first polymer of the first polymer layer can be phase-changed from a solid phase to a liquid phase.

2. The patch type thermometer according to claim 1, wherein a second polymer of the polymer layer is not phase-changed from the solid phase to the liquid phase.

3. The patch type thermometer according to claim 1, wherein the first polymer layer and the second polymer layer are formed as a laminated thin film.

4. The patch type thermometer according to claim 1, wherein body temperature is measured by measuring changes of magnetic field strength caused by a reversible change in distance between the magnetic sensor and the magnet.

5. The patch type thermometer according to claim 4, wherein the change in distance between the magnetic sensor and the magnet is caused by a volume change of the first polymer.

6. The patch type thermometer according to claim 5, wherein the first polymer is phase-changed from the solid phase to the liquid phase as temperature rises, thereby a volume of the first polymer being changed.

7. The patch type thermometer according to claim 6, wherein the temperature is in a range of 35° C. to 40° C.

8. A method for measuring body temperature comprising the following steps:
contacting the patch type thermometer of claim 1 to a living body; and
measuring a distance change between the magnetic sensor and the magnet,
wherein the body temperature is measured by measuring a change of magnetic field strength caused by the distance change between the magnetic sensor and the magnet.

9. The method for measuring body temperature according to claim 8, wherein, the body temperature is in a range of 35° C. to 40° C.

* * * * *